(12) United States Patent
Whillock et al.

(10) Patent No.: US 8,630,464 B2
(45) Date of Patent: Jan. 14, 2014

(54) ADAPTIVE IRIS MATCHING USING DATABASE INDEXING

(75) Inventors: Rand Whillock, North Oaks, MN (US); Rida Hamza, Maple Grove, MN (US); Isaac Cohen, West Hartfort, CT (US)

(73) Assignee: Honeywell International Inc., Morristown, NJ (US)

( * ) Notice: Subject to any disclaimer, the term of this patent is extended or adjusted under 35 U.S.C. 154(b) by 453 days.

(21) Appl. No.: 12/814,272

(22) Filed: Jun. 11, 2010

(65) Prior Publication Data
US 2010/0315500 A1    Dec. 16, 2010

Related U.S. Application Data

(60) Provisional application No. 61/268,678, filed on Jun. 15, 2009.

(51) Int. Cl.
*G06K 9/00* (2006.01)
*G06K 9/46* (2006.01)
*G06K 9/62* (2006.01)

(52) U.S. Cl.
USPC ............................ 382/117; 382/203; 382/209

(58) Field of Classification Search
None
See application file for complete search history.

(56) References Cited

U.S. PATENT DOCUMENTS

| | | | |
|---|---|---|---|
| 4,641,349 A | 2/1987 | Flom et al. | |
| 4,836,670 A | 6/1989 | Hutchinson | |
| 5,231,674 A | 7/1993 | Cleveland et al. | |
| 5,291,560 A | 3/1994 | Daugman | |
| 5,293,427 A | 3/1994 | Ueno et al. | |
| 5,359,382 A | 10/1994 | Uenaka | |
| 5,404,013 A | 4/1995 | Tajima | |
| 5,543,887 A | 8/1996 | Akashi | |
| 5,551,027 A | 8/1996 | Choy et al. | |
| 5,572,596 A | 11/1996 | Wildes et al. | |
| 5,608,472 A | 3/1997 | Szirth et al. | |
| 5,664,239 A | 9/1997 | Nakata | |
| 5,671,447 A | 9/1997 | Tokunaga | |
| 5,687,031 A | 11/1997 | Ishihara | |

(Continued)

FOREIGN PATENT DOCUMENTS

| EP | 0484076 | 5/1992 |
|---|---|---|
| EP | 0593386 | 4/1994 |

(Continued)

OTHER PUBLICATIONS

Chun et al., "Iris Recognition for Palm-Top Application," 2004, ICBA 2004, LNCS 3072, pp. 426-433.*

(Continued)

*Primary Examiner* — Brian P Werner
*Assistant Examiner* — David F Dunphy
(74) *Attorney, Agent, or Firm* — Seager Tufte & Wickhem LLC.

(57) ABSTRACT

An adaptive iris matching approach for processing images of irises having a quality not sufficient for conventional non-adaptive matching approaches. Visible regions in a radial direction on an iris, without segmenting a circumferential of the iris, may be processed. A boundary of the visible region of the iris may be estimated. An iris map may be constructed with the non-visible portion of the iris masked. The iris map may be at least partially encoded. Partial codes of the iris map may be extracted to index at least portions of a database containing iris information. Irises may be retrieved from the database with an iris code as a query.

18 Claims, 4 Drawing Sheets

(56) References Cited

U.S. PATENT DOCUMENTS

| | | | |
|---|---|---|---|
| 5,717,512 | A | 2/1998 | Chmielewski, Jr. et al. |
| 5,751,836 | A | 5/1998 | Wildes et al. |
| 5,859,686 | A | 1/1999 | Aboutalib et al. |
| 5,860,032 | A | 1/1999 | Iwane |
| 5,896,174 | A | 4/1999 | Nakata |
| 5,901,238 | A | 5/1999 | Matsushita |
| 5,909,269 | A | 6/1999 | Isogai et al. |
| 5,953,440 | A | 9/1999 | Zhang et al. |
| 5,956,122 | A | 9/1999 | Doster |
| 5,978,494 | A | 11/1999 | Zhang |
| 5,991,429 | A | 11/1999 | Coffin et al. |
| 6,005,704 | A | 12/1999 | Chmielewski, Jr. et al. |
| 6,007,202 | A | 12/1999 | Apple et al. |
| 6,012,376 | A | 1/2000 | Hanke et al. |
| 6,021,210 | A | 2/2000 | Camus et al. |
| 6,028,949 | A | 2/2000 | McKendall |
| 6,055,322 | A | 4/2000 | Salganicoff et al. |
| 6,064,752 | A | 5/2000 | Rozmus et al. |
| 6,069,967 | A | 5/2000 | Rozmus et al. |
| 6,081,607 | A | 6/2000 | Mori et al. |
| 6,088,470 | A | 7/2000 | Camus et al. |
| 6,091,899 | A | 7/2000 | Konishi et al. |
| 6,101,477 | A | 8/2000 | Hohle et al. |
| 6,104,431 | A | 8/2000 | Inoue et al. |
| 6,108,636 | A | 8/2000 | Yap et al. |
| 6,119,096 | A | 9/2000 | Mann et al. |
| 6,120,461 | A | 9/2000 | Smyth |
| 6,134,339 | A | 10/2000 | Luo |
| 6,144,754 | A | 11/2000 | Okano et al. |
| 6,246,751 | B1 | 6/2001 | Bergl et al. |
| 6,247,813 | B1 | 6/2001 | Kim et al. |
| 6,252,977 | B1 | 6/2001 | Salganicoff et al. |
| 6,259,478 | B1 | 7/2001 | Hori |
| 6,282,475 | B1 | 8/2001 | Washington |
| 6,285,505 | B1 | 9/2001 | Melville et al. |
| 6,285,780 | B1 | 9/2001 | Yamakita et al. |
| 6,289,113 | B1 | 9/2001 | McHugh et al. |
| 6,299,306 | B1 | 10/2001 | Braithwaite et al. |
| 6,308,015 | B1 | 10/2001 | Matsumoto |
| 6,309,069 | B1 | 10/2001 | Seal et al. |
| 6,320,610 | B1 | 11/2001 | Van Sant et al. |
| 6,320,612 | B1 | 11/2001 | Young |
| 6,320,973 | B2 | 11/2001 | Suzaki et al. |
| 6,323,761 | B1 | 11/2001 | Son |
| 6,325,765 | B1 | 12/2001 | Hay et al. |
| 6,330,674 | B1 | 12/2001 | Angelo et al. |
| 6,332,193 | B1 | 12/2001 | Glass et al. |
| 6,344,683 | B1 | 2/2002 | Kim |
| 6,370,260 | B1 | 4/2002 | Pavlidis et al. |
| 6,377,699 | B1 | 4/2002 | Musgrave et al. |
| 6,393,136 | B1 | 5/2002 | Amir et al. |
| 6,400,835 | B1 | 6/2002 | Lemelson et al. |
| 6,424,727 | B1 | 7/2002 | Musgrave et al. |
| 6,424,845 | B1 | 7/2002 | Emmoft et al. |
| 6,433,818 | B1 | 8/2002 | Steinberg et al. |
| 6,438,752 | B1 | 8/2002 | McClard |
| 6,441,482 | B1 | 8/2002 | Foster |
| 6,446,045 | B1 | 9/2002 | Stone et al. |
| 6,483,930 | B1 | 11/2002 | Musgrave et al. |
| 6,484,936 | B1 | 11/2002 | Nicoll et al. |
| 6,490,443 | B1 | 12/2002 | Freeny, Jr. |
| 6,493,363 | B1 | 12/2002 | Roger et al. |
| 6,493,669 | B1 | 12/2002 | Curry et al. |
| 6,494,363 | B1 | 12/2002 | Roger et al. |
| 6,503,163 | B1 | 1/2003 | Van Sant et al. |
| 6,505,193 | B1 | 1/2003 | Musgrave et al. |
| 6,506,078 | B1 | 1/2003 | Mori et al. |
| 6,508,397 | B1 | 1/2003 | Do |
| 6,516,078 | B1 | 2/2003 | Yang et al. |
| 6,516,087 | B1 | 2/2003 | Camus |
| 6,516,416 | B2 | 2/2003 | Gregg et al. |
| 6,522,772 | B1 | 2/2003 | Morrison et al. |
| 6,523,165 | B2 | 2/2003 | Liu et al. |
| 6,526,160 | B1 | 2/2003 | Ito |
| 6,532,298 | B1 | 3/2003 | Cambier et al. |
| 6,540,392 | B1 | 4/2003 | Braithwaite |
| 6,542,624 | B1 | 4/2003 | Oda |
| 6,546,121 | B1 | 4/2003 | Oda |
| 6,553,494 | B1 | 4/2003 | Glass |
| 6,580,356 | B1 | 6/2003 | Alt et al. |
| 6,591,001 | B1 | 7/2003 | Oda et al. |
| 6,591,064 | B2 | 7/2003 | Higashiyama et al. |
| 6,594,377 | B1 | 7/2003 | Kim et al. |
| 6,594,399 | B1 | 7/2003 | Camus et al. |
| 6,598,971 | B2 | 7/2003 | Cleveland |
| 6,600,878 | B2 | 7/2003 | Pregara |
| 6,614,919 | B1 | 9/2003 | Suzaki et al. |
| 6,652,099 | B2 | 11/2003 | Chae et al. |
| 6,674,367 | B2 | 1/2004 | Sweatte |
| 6,687,389 | B2 | 2/2004 | McCartney et al. |
| 6,690,997 | B2 | 2/2004 | Rivalto |
| 6,708,176 | B2 | 3/2004 | Strunk et al. |
| 6,709,734 | B2 | 3/2004 | Higashi et al. |
| 6,711,562 | B1 | 3/2004 | Ross et al. |
| 6,714,665 | B1 | 3/2004 | Hanna et al. |
| 6,718,049 | B2 | 4/2004 | Pavlidis et al. |
| 6,718,050 | B1 | 4/2004 | Yamamoto |
| 6,718,665 | B2 | 4/2004 | Hess et al. |
| 6,732,278 | B2 | 5/2004 | Baird, III et al. |
| 6,734,783 | B1 | 5/2004 | Anbai |
| 6,745,520 | B2 | 6/2004 | Puskaric et al. |
| 6,750,435 | B2 | 6/2004 | Ford |
| 6,751,733 | B1 | 6/2004 | Nakamura et al. |
| 6,753,919 | B1 | 6/2004 | Daugman |
| 6,754,640 | B2 | 6/2004 | Bozeman |
| 6,760,467 | B1 | 7/2004 | Min et al. |
| 6,765,470 | B2 | 7/2004 | Shinzaki |
| 6,766,041 | B2 | 7/2004 | Golden et al. |
| 6,775,774 | B1 | 8/2004 | Harper |
| 6,785,406 | B1 | 8/2004 | Kamada |
| 6,792,134 | B2 | 9/2004 | Chen et al. |
| 6,793,134 | B2 | 9/2004 | Clark |
| 6,819,219 | B1 | 11/2004 | Bolle et al. |
| 6,829,370 | B1 | 12/2004 | Pavlidis et al. |
| 6,832,044 | B2 | 12/2004 | Doi et al. |
| 6,836,554 | B1 | 12/2004 | Bolle et al. |
| 6,837,436 | B2 | 1/2005 | Swartz et al. |
| 6,845,879 | B2 | 1/2005 | Park |
| 6,853,444 | B2 | 2/2005 | Haddad |
| 6,867,683 | B2 | 3/2005 | Calvesio et al. |
| 6,873,960 | B1 | 3/2005 | Wood et al. |
| 6,896,187 | B2 | 5/2005 | Stockhammer |
| 6,905,411 | B2 | 6/2005 | Nguyen et al. |
| 6,920,237 | B2 | 7/2005 | Chen et al. |
| 6,930,707 | B2 | 8/2005 | Bates et al. |
| 6,934,849 | B2 | 8/2005 | Kramer et al. |
| 6,950,139 | B2 | 9/2005 | Fujinawa |
| 6,954,738 | B2 | 10/2005 | Wang et al. |
| 6,957,341 | B2 | 10/2005 | Rice et al. |
| 6,964,666 | B2 | 11/2005 | Jackson |
| 6,968,457 | B2 | 11/2005 | Tam |
| 6,972,797 | B2 | 12/2005 | Izumi |
| 6,992,562 | B2 | 1/2006 | Fuks et al. |
| 6,992,717 | B2 | 1/2006 | Hatano |
| 7,003,669 | B2 | 2/2006 | Monk |
| 7,017,359 | B2 | 3/2006 | Kim et al. |
| 7,030,351 | B2 | 4/2006 | Wasserman et al. |
| 7,031,539 | B2 | 4/2006 | Tisse et al. |
| 7,043,056 | B2 | 5/2006 | Edwards et al. |
| 7,053,948 | B2 | 5/2006 | Konishi |
| 7,058,209 | B2 | 6/2006 | Chen et al. |
| 7,071,971 | B2 | 7/2006 | Elberbaum |
| 7,076,087 | B2 | 7/2006 | Wakiyama |
| 7,084,904 | B2 | 8/2006 | Liu et al. |
| 7,092,555 | B2 | 8/2006 | Lee et al. |
| 7,095,901 | B2 | 8/2006 | Lee et al. |
| 7,100,818 | B2 | 9/2006 | Swaine |
| 7,113,170 | B2 | 9/2006 | Lauper et al. |
| 7,114,080 | B2 | 9/2006 | Rahman et al. |
| 7,120,607 | B2 | 10/2006 | Bolle et al. |
| 7,125,335 | B2 | 10/2006 | Rowe |
| 7,130,452 | B2 | 10/2006 | Bolle et al. |
| 7,130,453 | B2 | 10/2006 | Kondo et al. |
| 7,135,980 | B2 | 11/2006 | Moore et al. |

(56) References Cited

U.S. PATENT DOCUMENTS

| | | |
|---|---|---|
| 7,136,581 B2 | 11/2006 | Fujii |
| 7,145,457 B2 | 12/2006 | Spitz et al. |
| 7,146,027 B2 | 12/2006 | Kim et al. |
| 7,152,085 B2 | 12/2006 | Tisse |
| 7,155,035 B2 | 12/2006 | Kondo et al. |
| 7,169,052 B2 | 1/2007 | Beaulieu |
| 7,173,348 B2 | 2/2007 | Voda et al. |
| 7,174,036 B2 | 2/2007 | Ohba |
| 7,177,449 B2 | 2/2007 | Russon et al. |
| 7,181,049 B2 | 2/2007 | Ike |
| 7,183,895 B2 | 2/2007 | Bazakos et al. |
| 7,184,577 B2 | 2/2007 | Chen et al. |
| 7,187,786 B2 | 3/2007 | Kee |
| 7,191,936 B2 | 3/2007 | Smith et al. |
| 7,197,166 B2 | 3/2007 | Jeng |
| 7,197,173 B2 | 3/2007 | Jones et al. |
| 7,203,343 B2 | 4/2007 | Manasse et al. |
| 7,204,425 B2 | 4/2007 | Mosher, Jr. et al. |
| 7,206,431 B2 | 4/2007 | Schuessler |
| 7,215,797 B2 | 5/2007 | Park |
| 7,226,164 B2 | 6/2007 | Abourizk et al. |
| 7,239,726 B2 | 7/2007 | Li |
| 7,269,737 B2 | 9/2007 | Robinson |
| 7,271,839 B2 | 9/2007 | Lee et al. |
| 7,272,380 B2 | 9/2007 | Lee et al. |
| 7,272,385 B2 | 9/2007 | Mirouze et al. |
| 7,277,561 B2 | 10/2007 | Shin |
| 7,277,891 B2 | 10/2007 | Howard et al. |
| 7,280,984 B2 | 10/2007 | Phelan, III et al. |
| 7,287,021 B2 | 10/2007 | De Smet |
| 7,298,873 B2 | 11/2007 | Miller, Jr. et al. |
| 7,298,874 B2 | 11/2007 | Cho |
| 7,305,089 B2 | 12/2007 | Morikawa et al. |
| 7,309,126 B2 | 12/2007 | Mihashi et al. |
| 7,312,818 B2 | 12/2007 | Ooi et al. |
| 7,313,529 B2 | 12/2007 | Thompson |
| 7,315,233 B2 | 1/2008 | Yuhara |
| 7,331,667 B2 | 2/2008 | Grotehusmann et al. |
| 7,333,637 B2 | 2/2008 | Walfridsson |
| 7,333,798 B2 | 2/2008 | Hodge |
| 7,336,806 B2 | 2/2008 | Schonberg et al. |
| 7,338,167 B2 | 3/2008 | Zelvin et al. |
| 7,346,195 B2 | 3/2008 | Lauper et al. |
| 7,346,779 B2 | 3/2008 | Leeper |
| 7,353,399 B2 | 4/2008 | Ooi et al. |
| 7,362,210 B2 | 4/2008 | Bazakos et al. |
| 7,362,370 B2 | 4/2008 | Sakamoto et al. |
| 7,362,884 B2 | 4/2008 | Willis et al. |
| 7,365,771 B2 | 4/2008 | Kahn et al. |
| 7,380,938 B2 | 6/2008 | Chmielewski, Jr. et al. |
| 7,391,865 B2 | 6/2008 | Orsini et al. |
| 7,404,086 B2 | 7/2008 | Sands et al. |
| 7,406,184 B2 | 7/2008 | Wolff et al. |
| 7,414,648 B2 | 8/2008 | Imada |
| 7,417,682 B2 | 8/2008 | Kuwakino et al. |
| 7,418,115 B2 | 8/2008 | Northcott et al. |
| 7,421,097 B2 | 9/2008 | Hamza et al. |
| 7,436,986 B2 | 10/2008 | Caldwell |
| 7,443,441 B2 | 10/2008 | Hiraoka |
| 7,447,911 B2 | 11/2008 | Chou et al. |
| 7,460,693 B2 | 12/2008 | Loy et al. |
| 7,466,348 B2 | 12/2008 | Morikawa et al. |
| 7,467,809 B2 | 12/2008 | Breed et al. |
| 7,471,451 B2 | 12/2008 | Dent et al. |
| 7,472,283 B2 | 12/2008 | Angelo et al. |
| 7,486,806 B2 | 2/2009 | Azuma et al. |
| 7,506,172 B2 | 3/2009 | Bhakta |
| 7,512,254 B2 | 3/2009 | Vollkommer et al. |
| 7,518,651 B2 | 4/2009 | Butterworth |
| 7,537,568 B2 | 5/2009 | Moehring |
| 7,538,326 B2 | 5/2009 | Johnson et al. |
| 7,542,945 B2 | 6/2009 | Thompson et al. |
| 7,552,333 B2 | 6/2009 | Wheeler et al. |
| 7,580,620 B2 | 8/2009 | Raskar et al. |
| 7,593,550 B2 | 9/2009 | Hamza |
| 7,639,846 B2 | 12/2009 | Yoda |
| 7,722,461 B2 | 5/2010 | Gatto et al. |
| 7,751,598 B2 | 7/2010 | Matey et al. |
| 7,756,301 B2 | 7/2010 | Hamza |
| 7,756,407 B2 | 7/2010 | Raskar |
| 7,761,453 B2 | 7/2010 | Hamza |
| 7,777,802 B2 | 8/2010 | Shinohara et al. |
| 7,804,982 B2 | 9/2010 | Howard et al. |
| 2001/0026632 A1 | 10/2001 | Tamai |
| 2001/0027116 A1 | 10/2001 | Baird |
| 2001/0047479 A1 | 11/2001 | Bromba et al. |
| 2001/0051924 A1 | 12/2001 | Uberti |
| 2002/0010857 A1 | 1/2002 | Karthik |
| 2002/0039433 A1 | 4/2002 | Shin |
| 2002/0040434 A1 | 4/2002 | Elliston et al. |
| 2002/0062280 A1 | 5/2002 | Zachariassen et al. |
| 2002/0112177 A1 | 8/2002 | Voltmer et al. |
| 2002/0142844 A1 | 10/2002 | Kerr |
| 2002/0150281 A1 | 10/2002 | Cho |
| 2002/0154794 A1 | 10/2002 | Cho |
| 2002/0158750 A1 | 10/2002 | Almalik |
| 2002/0175182 A1 | 11/2002 | Matthews |
| 2002/0186131 A1 | 12/2002 | Fettis |
| 2002/0191075 A1 | 12/2002 | Doi et al. |
| 2002/0191076 A1 | 12/2002 | Wada et al. |
| 2002/0194128 A1 | 12/2002 | Maritzen et al. |
| 2002/0194131 A1 | 12/2002 | Dick |
| 2002/0198731 A1 | 12/2002 | Barnes et al. |
| 2003/0002714 A1 | 1/2003 | Wakiyama |
| 2003/0012413 A1 | 1/2003 | Kusakari et al. |
| 2003/0038173 A1 | 2/2003 | Blackson et al. |
| 2003/0046228 A1 | 3/2003 | Berney |
| 2003/0055689 A1 | 3/2003 | Block et al. |
| 2003/0055787 A1 | 3/2003 | Fujii |
| 2003/0065626 A1 | 4/2003 | Allen |
| 2003/0071743 A1 | 4/2003 | Seah et al. |
| 2003/0072475 A1 | 4/2003 | Tamori |
| 2003/0073499 A1 | 4/2003 | Reece |
| 2003/0074317 A1 | 4/2003 | Hofi |
| 2003/0074326 A1 | 4/2003 | Byers |
| 2003/0080194 A1 | 5/2003 | O'Hara et al. |
| 2003/0092489 A1 | 5/2003 | Veradej |
| 2003/0098776 A1 | 5/2003 | Friedli |
| 2003/0099379 A1 | 5/2003 | Monk et al. |
| 2003/0107097 A1 | 6/2003 | McArthur et al. |
| 2003/0107645 A1 | 6/2003 | Yoon |
| 2003/0115148 A1 | 6/2003 | Takhar |
| 2003/0116630 A1 | 6/2003 | Carey et al. |
| 2003/0118212 A1 | 6/2003 | Min et al. |
| 2003/0125054 A1 | 7/2003 | Garcia |
| 2003/0125057 A1 | 7/2003 | Pesola |
| 2003/0126560 A1 | 7/2003 | Kurapati et al. |
| 2003/0131245 A1 | 7/2003 | Linderman |
| 2003/0133597 A1 | 7/2003 | Moore et al. |
| 2003/0140235 A1 | 7/2003 | Immega et al. |
| 2003/0140928 A1 | 7/2003 | Bui et al. |
| 2003/0141411 A1 | 7/2003 | Pandya et al. |
| 2003/0149881 A1 | 8/2003 | Patel et al. |
| 2003/0152251 A1 | 8/2003 | Ike |
| 2003/0156741 A1 | 8/2003 | Lee et al. |
| 2003/0158762 A1 | 8/2003 | Wu |
| 2003/0158821 A1 | 8/2003 | Maia |
| 2003/0159051 A1 | 8/2003 | Hollnagel |
| 2003/0163739 A1 | 8/2003 | Armington et al. |
| 2003/0169334 A1 | 9/2003 | Braithwaite et al. |
| 2003/0174049 A1 | 9/2003 | Beigel et al. |
| 2003/0177051 A1 | 9/2003 | Driscoll et al. |
| 2003/0182151 A1 | 9/2003 | Taslitz |
| 2003/0182182 A1 | 9/2003 | Kocher |
| 2003/0189480 A1 | 10/2003 | Hamid |
| 2003/0189481 A1 | 10/2003 | Hamid |
| 2003/0191949 A1 | 10/2003 | Odagawa |
| 2003/0194112 A1 | 10/2003 | Lee |
| 2003/0210139 A1 | 11/2003 | Brooks et al. |
| 2003/0225711 A1 | 12/2003 | Paping |
| 2003/0236120 A1 | 12/2003 | Reece et al. |
| 2004/0002894 A1 | 1/2004 | Kocher |
| 2004/0005078 A1 | 1/2004 | Tillotson |
| 2004/0006553 A1 | 1/2004 | de Vries et al. |

(56) References Cited

U.S. PATENT DOCUMENTS

| | | |
|---|---|---|
| 2004/0010462 A1 | 1/2004 | Moon et al. |
| 2004/0025030 A1 | 2/2004 | Corbett-Clark et al. |
| 2004/0025053 A1 | 2/2004 | Hayward |
| 2004/0030930 A1 | 2/2004 | Nomura |
| 2004/0037450 A1 | 2/2004 | Bradski |
| 2004/0039914 A1 | 2/2004 | Barr et al. |
| 2004/0042641 A1 | 3/2004 | Jakubowski |
| 2004/0044627 A1 | 3/2004 | Russell et al. |
| 2004/0046640 A1 | 3/2004 | Jourdain et al. |
| 2004/0050924 A1 | 3/2004 | Mletzko et al. |
| 2004/0050930 A1 | 3/2004 | Rowe |
| 2004/0052405 A1 | 3/2004 | Walfridsson |
| 2004/0052418 A1 | 3/2004 | DeLean |
| 2004/0059590 A1 | 3/2004 | Mercredi et al. |
| 2004/0059953 A1 | 3/2004 | Purnell |
| 2004/0117636 A1 | 6/2004 | Cheng |
| 2004/0133804 A1 | 7/2004 | Smith et al. |
| 2004/0160518 A1 | 8/2004 | Park |
| 2004/0162870 A1 | 8/2004 | Matsuzaki et al. |
| 2004/0162984 A1 | 8/2004 | Freeman et al. |
| 2004/0172541 A1 | 9/2004 | Ando et al. |
| 2004/0193893 A1 | 9/2004 | Braithwaite et al. |
| 2004/0233038 A1 | 11/2004 | Beenau et al. |
| 2004/0252866 A1 | 12/2004 | Tisse et al. |
| 2004/0255168 A1 | 12/2004 | Murashita et al. |
| 2005/0008201 A1 | 1/2005 | Lee et al. |
| 2005/0012817 A1 | 1/2005 | Hampapur et al. |
| 2005/0029353 A1 | 2/2005 | Isemura et al. |
| 2005/0052566 A1 | 3/2005 | Kato |
| 2005/0055582 A1 | 3/2005 | Bazakos et al. |
| 2005/0063567 A1 | 3/2005 | Saitoh et al. |
| 2005/0084137 A1 | 4/2005 | Kim et al. |
| 2005/0084179 A1 | 4/2005 | Hanna et al. |
| 2005/0102502 A1 | 5/2005 | Sagen |
| 2005/0125258 A1 | 6/2005 | Yellin et al. |
| 2005/0129286 A1 | 6/2005 | Hekimian |
| 2005/0138385 A1 | 6/2005 | Friedli et al. |
| 2005/0138387 A1 | 6/2005 | Lam et al. |
| 2005/0146640 A1 | 7/2005 | Shibata |
| 2005/0151620 A1 | 7/2005 | Neumann |
| 2005/0152583 A1 | 7/2005 | Kondo et al. |
| 2005/0193212 A1 | 9/2005 | Yuhara |
| 2005/0199708 A1 | 9/2005 | Friedman |
| 2005/0206501 A1 | 9/2005 | Farhat |
| 2005/0206502 A1 | 9/2005 | Bernitz |
| 2005/0210267 A1 | 9/2005 | Sugano et al. |
| 2005/0210270 A1 | 9/2005 | Rohatgi et al. |
| 2005/0238214 A1 | 10/2005 | Matsuda et al. |
| 2005/0240778 A1 | 10/2005 | Saito |
| 2005/0248725 A1 | 11/2005 | Ikoma et al. |
| 2005/0249385 A1 | 11/2005 | Kondo et al. |
| 2005/0255840 A1 | 11/2005 | Markham |
| 2006/0093190 A1 | 5/2006 | Cheng et al. |
| 2006/0147094 A1 | 7/2006 | Yoo |
| 2006/0165266 A1 | 7/2006 | Hamza |
| 2006/0274919 A1 | 12/2006 | LoIacono et al. |
| 2007/0036397 A1* | 2/2007 | Hamza ................ 382/117 |
| 2007/0140531 A1* | 6/2007 | Hamza ................ 382/117 |
| 2007/0160266 A1 | 7/2007 | Jones et al. |
| 2007/0189582 A1 | 8/2007 | Hamza et al. |
| 2007/0206840 A1 | 9/2007 | Jacobson |
| 2007/0211924 A1 | 9/2007 | Hamza |
| 2007/0274570 A1* | 11/2007 | Hamza ................ 382/117 |
| 2007/0274571 A1* | 11/2007 | Hamza ................ 382/117 |
| 2007/0286590 A1 | 12/2007 | Terashima |
| 2008/0005578 A1 | 1/2008 | Shafir |
| 2008/0075334 A1 | 3/2008 | Determan et al. |
| 2008/0075441 A1 | 3/2008 | Jelinek et al. |
| 2008/0075445 A1 | 3/2008 | Whillock et al. |
| 2008/0104415 A1 | 5/2008 | Palti-Wasserman et al. |
| 2008/0148030 A1 | 6/2008 | Goffin |
| 2008/0211347 A1 | 9/2008 | Wright et al. |
| 2008/0252412 A1 | 10/2008 | Larsson et al. |
| 2009/0046899 A1 | 2/2009 | Northcott et al. |
| 2009/0092283 A1 | 4/2009 | Whillock et al. |
| 2009/0316993 A1 | 12/2009 | Brasnett et al. |
| 2010/0033677 A1 | 2/2010 | Jelinek |
| 2010/0034529 A1 | 2/2010 | Jelinek |
| 2010/0182440 A1 | 7/2010 | McCloskey |
| 2010/0239119 A1 | 9/2010 | Bazakos et al. |

FOREIGN PATENT DOCUMENTS

| | | |
|---|---|---|
| EP | 0878780 | 11/1998 |
| EP | 0899680 | 3/1999 |
| EP | 0910986 | 4/1999 |
| EP | 0962894 | 12/1999 |
| EP | 1018297 | 7/2000 |
| EP | 1024463 | 8/2000 |
| EP | 1028398 | 8/2000 |
| EP | 1041506 | 10/2000 |
| EP | 1041523 | 10/2000 |
| EP | 1126403 | 8/2001 |
| EP | 1139270 | 10/2001 |
| EP | 1237117 | 9/2002 |
| EP | 1477925 | 11/2004 |
| EP | 1635307 | 3/2006 |
| GB | 2369205 | 5/2002 |
| GB | 2371396 | 7/2002 |
| GB | 2375913 | 11/2002 |
| GB | 2402840 | 12/2004 |
| GB | 2411980 | 9/2005 |
| JP | 9161135 | 6/1997 |
| JP | 9198545 | 7/1997 |
| JP | 9201348 | 8/1997 |
| JP | 9147233 | 9/1997 |
| JP | 9234264 | 9/1997 |
| JP | 9305765 | 11/1997 |
| JP | 9319927 | 12/1997 |
| JP | 10021392 | 1/1998 |
| JP | 10040386 | 2/1998 |
| JP | 10049728 | 2/1998 |
| JP | 10137219 | 5/1998 |
| JP | 10137221 | 5/1998 |
| JP | 10137222 | 5/1998 |
| JP | 10137223 | 5/1998 |
| JP | 10248827 | 9/1998 |
| JP | 10269183 | 10/1998 |
| JP | 11047117 | 2/1999 |
| JP | 11089820 | 4/1999 |
| JP | 11200684 | 7/1999 |
| JP | 11203478 | 7/1999 |
| JP | 11213047 | 8/1999 |
| JP | 11339037 | 12/1999 |
| JP | 2000005149 | 1/2000 |
| JP | 2000005150 | 1/2000 |
| JP | 2000011163 | 1/2000 |
| JP | 2000023946 | 1/2000 |
| JP | 2000083930 | 3/2000 |
| JP | 2000102510 | 4/2000 |
| JP | 2000102524 | 4/2000 |
| JP | 2000105830 | 4/2000 |
| JP | 2000107156 | 4/2000 |
| JP | 2000139878 | 5/2000 |
| JP | 2000155863 | 6/2000 |
| JP | 2000182050 | 6/2000 |
| JP | 2000185031 | 7/2000 |
| JP | 2000194972 | 7/2000 |
| JP | 2000237167 | 9/2000 |
| JP | 2000242788 | 9/2000 |
| JP | 2000259817 | 9/2000 |
| JP | 2000356059 | 12/2000 |
| JP | 2000357232 | 12/2000 |
| JP | 2001005948 | 1/2001 |
| JP | 2001067399 | 3/2001 |
| JP | 2001101429 | 4/2001 |
| JP | 2001167275 | 6/2001 |
| JP | 2001222661 | 8/2001 |
| JP | 2001292981 | 10/2001 |
| JP | 2001297177 | 10/2001 |
| JP | 2001358987 | 12/2001 |
| JP | 2002119477 | 4/2002 |
| JP | 2002133415 | 5/2002 |
| JP | 2002153444 | 5/2002 |

(56) References Cited

FOREIGN PATENT DOCUMENTS

| | | |
|---|---|---|
| JP | 2002153445 | 5/2002 |
| JP | 2002260071 | 9/2002 |
| JP | 2002271689 | 9/2002 |
| JP | 2002286650 | 10/2002 |
| JP | 2002312772 | 10/2002 |
| JP | 2002329204 | 11/2002 |
| JP | 2003006628 | 1/2003 |
| JP | 2003036434 | 2/2003 |
| JP | 2003108720 | 4/2003 |
| JP | 2003108983 | 4/2003 |
| JP | 2003132355 | 5/2003 |
| JP | 2003150942 | 5/2003 |
| JP | 2003153880 | 5/2003 |
| JP | 2003242125 | 8/2003 |
| JP | 2003271565 | 9/2003 |
| JP | 2003271940 | 9/2003 |
| JP | 2003308522 | 10/2003 |
| JP | 2003308523 | 10/2003 |
| JP | 2003317102 | 11/2003 |
| JP | 2003331265 | 11/2003 |
| JP | 2004005167 | 1/2004 |
| JP | 2004021406 | 1/2004 |
| JP | 2004030334 | 1/2004 |
| JP | 2004038305 | 2/2004 |
| JP | 2004094575 | 3/2004 |
| JP | 2004152046 | 5/2004 |
| JP | 2004163356 | 6/2004 |
| JP | 2004164483 | 6/2004 |
| JP | 2004171350 | 6/2004 |
| JP | 2004171602 | 6/2004 |
| JP | 2004206444 | 7/2004 |
| JP | 2004220376 | 8/2004 |
| JP | 2004261515 | 9/2004 |
| JP | 2004280221 | 10/2004 |
| JP | 2004280547 | 10/2004 |
| JP | 2004287621 | 10/2004 |
| JP | 2004315127 | 11/2004 |
| JP | 2004318248 | 11/2004 |
| JP | 2005004524 | 1/2005 |
| JP | 2005011207 | 1/2005 |
| JP | 2005025577 | 1/2005 |
| JP | 2005038257 | 2/2005 |
| JP | 2005062990 | 3/2005 |
| JP | 2005115961 | 4/2005 |
| JP | 2005148883 | 6/2005 |
| JP | 2005242677 | 9/2005 |
| WO | WO 97/17674 | 5/1997 |
| WO | WO 97/21188 | 6/1997 |
| WO | WO 98/02083 | 1/1998 |
| WO | WO 98/08439 | 3/1998 |
| WO | WO 99/32317 | 7/1999 |
| WO | WO 99/52422 | 10/1999 |
| WO | WO 99/65175 | 12/1999 |
| WO | WO 00/28484 | 5/2000 |
| WO | WO 00/29986 | 5/2000 |
| WO | WO 00/31677 | 6/2000 |
| WO | WO 00/36605 | 6/2000 |
| WO | WO 00/62239 | 10/2000 |
| WO | WO 01/01329 | 1/2001 |
| WO | WO 01/03100 | 1/2001 |
| WO | WO 01/28476 | 4/2001 |
| WO | WO 01/35348 | 5/2001 |
| WO | WO 01/35349 | 5/2001 |
| WO | WO 01/40982 | 6/2001 |
| WO | WO 01/63994 | 8/2001 |
| WO | WO 01/69490 | 9/2001 |
| WO | WO 01/86599 | 11/2001 |
| WO | WO 02/01451 | 1/2002 |
| WO | WO 02/19030 | 3/2002 |
| WO | WO 02/35452 | 5/2002 |
| WO | WO 02/35480 | 5/2002 |
| WO | WO 02/091735 | 11/2002 |
| WO | WO 02/095657 | 11/2002 |
| WO | WO 03/002387 | 1/2003 |
| WO | WO 03/003910 | 1/2003 |
| WO | WO 03/054777 | 7/2003 |
| WO | WO 03/077077 | 9/2003 |
| WO | WO 2004/029863 | 4/2004 |
| WO | WO 2004/042646 | 5/2004 |
| WO | WO 2004/055737 | 7/2004 |
| WO | WO 2004/089214 | 10/2004 |
| WO | WO 2004/097743 | 11/2004 |
| WO | WO 2005/008567 | 1/2005 |
| WO | WO 2005/013181 | 2/2005 |
| WO | WO 2005/024698 | 3/2005 |
| WO | WO 2005/024708 | 3/2005 |
| WO | WO 2005/024709 | 3/2005 |
| WO | WO 2005/029388 | 3/2005 |
| WO | WO 2005/062235 | 7/2005 |
| WO | WO 2005/069252 | 7/2005 |
| WO | WO 2005/093510 | 10/2005 |
| WO | WO 2005/093681 | 10/2005 |
| WO | WO 2005/096962 | 10/2005 |
| WO | WO 2005/098531 | 10/2005 |
| WO | WO 2005/104704 | 11/2005 |
| WO | WO 2005/109344 | 11/2005 |
| WO | WO 2006/012645 | 2/2006 |
| WO | WO 2006/023046 | 3/2006 |
| WO | WO 2006/051462 | 5/2006 |
| WO | WO 2006/063076 | 6/2006 |
| WO | WO 2006/081209 | 8/2006 |
| WO | WO 2006/081505 | 8/2006 |
| WO | WO 2007/101269 | 9/2007 |
| WO | WO 2007/101275 | 9/2007 |
| WO | WO 2007/101276 | 9/2007 |
| WO | WO 2007/103698 | 9/2007 |
| WO | WO 2007/103701 | 9/2007 |
| WO | WO 2007/103834 | 9/2007 |
| WO | WO 2008/016724 | 2/2008 |
| WO | WO 2008/019168 | 2/2008 |
| WO | WO 2008/019169 | 2/2008 |
| WO | WO 2008/021584 | 2/2008 |
| WO | WO 2008/031089 | 3/2008 |
| WO | WO 2008/040026 | 4/2008 |

OTHER PUBLICATIONS

Proenca et al, Iris Recognition: Measuring Feature's Quality for the Feature Selection in Unconstrained Image Capture Environments, 2006, IEEE Proceedings of the 2006 International Conference on Computational Intelligence for Homeland Security and Personal Safety—CIHSPS 2006, vol. 1, pp. 1-5.*
U.S. Appl. No. 13/077,821, filed Mar. 30, 2011.
Freeboy, "Adaptive Optics Speeds Up Airport Immigration," Optics. org/ole, 2 pages, Jan. 2009.
http://www.imagine-eyes.com/content/view/100/115/, "INOVEO—Ultra-High Resolution Retinal Imaging with Adaptive Optics," 2 pages, printed Feb. 22, 2010.
AOptix Technologies, "Introducing the AOptix InSight 2 Meter Iris Recognition System," 6 pages, 2010.
Belhumeur et al., "Eigenfaces Vs. Fisherfaces: Recognition Using Class Specific Linear Projection," 14 pages, prior to Jun. 11, 2010.
Bentley et al., "Multidimensional Binary Search Trees Used for Associative Searching," Communications of the ACM, vol. 18, No. 9, pp. 509-517, Sep. 1975.
Blackman et al., "Chapter 9, Multiple Sensor Tracking: Issues and Methods," Design and Analysis of Modern Tracking Systems, Artech House, pp. 595-659, 1999.
Brasnett et al., "A Robust Visual Identifier Using the Trace Transform," 6 pages, prior to Jun. 11, 2010.
Buades et al., "A Review of Image Denoising Algorithms, with a New One," Multiscale Modeling & Simulation, vol. 4, No. 2, pp. 490-530, 2005.
Chen et al., "Localized Iris Image Quality Using 2-D Wavelets," LNCS vol. 3832, pp. 373-381, 2005.
Chow et al., "Towards a System for Automatic Facial Feature Detection," Pattern Recognition vol. 26, No. 12, pp. 1739-1755, 1993.
U.S. Appl. No. 12/792,498, filed Jun. 2, 2010.
U.S. Appl. No. 12/814,232, filed Jun. 11, 2010.
Cula et al., "Bidirectional Imaging and Modeling of Skin Texture," Proceedings of Texture 2003, 6 pages, Oct. 17, 2003.

(56) References Cited

OTHER PUBLICATIONS

Cula et al., "Bidirectional Imaging and Modeling of Skin Texture," IEEE Transactions on Biomedical Engineering, vol. 51, No. 12, pp. 2148-2159, 2004.
Cula et al., "Compact Representation of Bidirectional Texture Functions," Proceedings of IEEE Computer Soviet Conference on Computer Vision and Pattern Recognition 2001, 8 pages, 2001.
Cula et al., "Skin Texture Modeling," International Journal of Computer Vision 2004, 34 pages, 2004.
Dabov et al., "Image Denoising by Sparse 3-D Transform-Domain Collaborative Filtering," IEEE Transactions on Image Processing, vol. 16, No. 8, pp. 2080-2095, Aug. 2007.
Dabov et al., "Image Restoration by Spars 3D Transform Collaborative Filtering," SPIE vol. 6812 681207-1, 12 pages, 2008.
Daugman, "High Confidence Visual Recognition of Persons by a Test of Statistical Independence," IEEE Transactions on Pattern Analysis and Machine Intelligence, vol. 15, No. 11, pp. 1148-1161, 1993.
Daugman, "Probing the Uniqueness and Randomness of Iris Codes: Results from 200 Billion Iris Pair Comparisons," Proceedings of the IEEE vol. 94, No. 11, pp. 1928-1935, Nov. 2006.
Fooprateepsiri et al., "A Highly Robust Method for Face Authentication," IEEE 2009 First Asian Conference on Intelligent Information and Database Systems, pp. 380-385, 2009.
Fooprateepsiri et al., "Face Verification Base-On Hausdorff-Shape Context," IEEE 2009 Asia Conference on Informatics in Control, Automation and Robotics, pp. 240-244, 2009.
Forstner et al., "A Metric for Covariance Matrices," 16 pages, prior to Jun. 11, 2010.
Gan et al., "Applications of Wavelet Packets Decomposition in Iris Recognition," LNCS vol. 3832, pp. 443-449, 2005.
Hampapur et al., "Smart Surveillance: Applications, Technologies and Implications," IEEE, 6 pages, Dec. 15-18, 2003.
Hamza et al., "Standoff Iris Recognition Usin Non-Iterative Polar Based Segmentation," Proceedings of SPIE vol. 6944, 8 pages, 2008.
Hanna et al., "A System for Non-Intrusive Human Iris Acquisition and Identification," IAPR Workshop on Machine Vision Applications, pp. 200-203, Nov. 12-14, 1996.
http://en.wikipedia.org/wiki/Radon_transform, "Radon Transform," 5 pages, printed May 14, 2010.
Ivins et al., "A Deformable Model of the Human Iris for Measuring Small Three-Dimensional Eye Movements," Machine Vision and Applications, vol. 11, pp. 42-51, 1998.
Kadyrov et al., "The Trace Transform and Its Applications," IEEE Transactions on Pattern Analysis and Machine Intelligence, vol. 23, No. 8, pp. 811-828, Aug. 2001.
Kadyrov et al., "The Trace Transform as a Tool to Invariant Feature Construction," 3 pages, prior to Jun. 11, 2010.
Kang et al., "Improved Dual Action Contour for Iris Recognition," 10 pages, prior to Jun. 11, 2010.
Kawaguchi et al., "Detection of Eyes from Human Faces by Hough Transform and Separability Filter," IEEE, 4 pages, 2000.
Kong et al., "Detecting Eyelash and Reflection for Accurate Iris Segmentation," International Journal of Pattern Recognition and Artificial Intelligence, vol. 17, No. 6, pp. 1025-1034, 2003.
Li et al., "Appearance Modeling Using a Geometric Transform," IEEE Transactions on Image Processing, 17 pages, 2008.
Li et al., "Appearance Modeling Using a Geometric Transform," Journal Preparation for IEEE Transactions on Image Processing, 30 pages, Nov. 5, 2006.
Ma et al., "Local Intensity Variation Analysis for Iris Recognition," Pattern Recognition, vol. 37, pp. 1287-1298, 2004.
Ma et al., "Video Sequence Querying Using Clustering of Objects' Appearance Models," Advances in Visual Computing Third Annual Symposium, ISVC 2007, 14 pages, 2007.
Monro et al., "DCT-Based Iris Recognition," IEEE Transactions on Pattern Analysis and Machine Intelligence, vol. 29, No. 4, Apr. 2007.
Noh et al., "A Novel Method to Extract Features for Iris Recognition System," AVBPA 2003, LNCS 2688, pp. 862-868, 2003.
Ojala et al., "Multiresolution Gray-Scale and Rotation Invariant Texture Classification with Local Binary Patterns," IEEE Transactions on Pattern Analysis and Machine Intelligence, vol. 24, No. 7, 18 pages, Jul. 2002.
Pamudurthy et al., "Dynamic Approach for Face Recognition Using Digital Image Skin Correlation," Audio and Video Based Person Authentication $5^{th}$ International Conference, AVBPA 2005, Hilton Rye Town, NY, USA, 11 pages, Jul. 20-22, 2005.
Petrou et al., "The Trace Transform in a Nutshell," 9 pages, prior to Jun. 11, 2010.
Phillips et al., "FRVT 2006 and ICE 2006 Large-Scale Results," 56 pages, Mar. 2007.
Porikli et al., "Covariance Tracking Using Model Update Based on Means on Riemannian Manifolds," 8 pages, prior to Jun. 11, 2010.
Proenca et al., "Toward Noncooperative Iris Recognition: A Classification Approach Using Multiple Signatures," IEEE Transactions on Patern Analysis and Machine Intellingence, vol. 29, No. 4, pp. 607-612, Apr. 2007.
Ross et al., "Segmenting Non-Ideal Irises Using Geodesic Active Contours," IEEE 2006 Biometrics Symposium, 3 pages, 2006.
Shapiro et al., pp. 556-559 in Book Entitled "Computer Vision," Prentice Hall, prior to Jun. 11, 2010.
Stillman et al., "A System for Tracking and Recognizing Multiple People with Multiple Cameras," 6 pages, Aug. 1998.
Sun et al., "Iris Recognition Based on Non-local Comparisons," Sinobiometrics 2004, LNCS 3338, pp. 67-77, 2004.
Suzaki et al., "A Horse Identification System Using Biometrics," Systems and Computer in Japan, vol. 32, No. 14, pp. 12-23, 2001.
Trucco et al., "Robust Iris Location in Close-up Images of the Eye," Pattern Anal. Applic. vol. 8, pp. 247-255, 2005.
Turan et al., "Trace Transform Based Invariant Object Recognition System," 4 pages, prior to Jun. 11, 2010.
Turk et al., "Eigenfaces for Recognition," Journal of Cognitive Neuroscience, vol. 3, No. 1, 16 pages, 1991.
Wang et al., "Recent Developments in Human Motion Analysis," Pattern Recognition, vol. 36, pp. 585-601, 2003.
Wei et al., "Robust and Fast Assessment of Iris Image Quality," LNCS vol. 3832, pp. 464-471, 2005.
Zhao et al., "Dynamic Texture Recognition Using Local Binary Patterns with an Application to Facial Expressions," IEEE Transactions on Pattern Analysis and Machine Intelligence, vol. 29, No. 6, pp. 915-928, Jun. 2007.
Zhi-Hui et al., "Research Iris Serial Images Quality Assessment Method Based on HVS," Proceedings of SPIE, vol. 6034, 6 pages, 2006.
Avcibas et al., "Steganalysis Using Image Quality Metrics," IEEE Transactions on Image Processing, vol. 12, No. 2, pp. 221-229, Feb. 2003.
Boles, "A Security System Based on Human Iris Identification Using Wavelet Transform," IEEE First International Conference on Knowledge Based Intelligent Electronic Systems, May 21-23, Adelaide, Australia, pp. 533-541, 1997.
Bonney et al., "Iris Pattern Extraction Using Bit Planes and Standard Deviations," IEEE, pp. 582-586, 2004.
Camus et al., "Reliable and Fast Eye Finding in Close-up Images," IEEE, pp. 389-394, 2002.
Carson et al., "Blobworld: Image Segmentation Using Expectation-Maximization and Its Application to Image Querying," IEEE Transactions on Pattern Analysis and Machine Intelligence, vol. 24, No. 8, pp. 1026-1038, Aug. 2002.
Cui et al., "A Fast and Robust Iris Localization Method Based on Texture Segmentation," 8 pages, 2004.
Cui et al., "An Appearance-Based Method for Iris Detection," 6 pages, 2004.
Cui et al., "An Iris Detection Method Based on Structure Information," Advances in Biometric Person Authentication, International Workshop on Biometric Recognition Systems, IWBRS 2005, Beijing China, 10 pages, Oct. 22-23, 2005.
Cui et al., "An Iris Image Synthesis Method Based on PCA and Super-Resolution," IEEE Computer Society, Proceedings of the 17th International Conference on Pattern Recognition, 6 pages, Aug. 23-26, 2004.

(56) References Cited

OTHER PUBLICATIONS

Cui et al., "An Iris Recognition Algorithm Using Local Extreme Points," Biometric Authentication, First International Conference, ICBA 2004, Hong Kong, China, 10 pages, Jul. 15-17, 2004.
Daugman, "Results From 200 Billion Iris Cross-Comparisons," University of Cambridge Computer Laboratory, Technical Report, No. 635, 8 pages, Jun. 2005.
Daugman, "How Iris Recognition Works," IEEE 2002 International Conference on Image Processing, vol. I of III, 6 pages, Sep. 22-25, 2002.
Du et al., "A One-Dimensional Approach for Iris Identification," 11 pages, prior to Jan. 25, 2006.
Guo et al., "A System for Automatic Iris Capturing," Mitsubishi Electric Research Laboratories, Inc., 10 pages, 2005.
Guo, "Face, Expression, and Iris Recognition Using Learning-Based Approaches," 132 pages, 2006.
http://www.newscientisttech.com/article/dn11110-invention-covert-iris-sc, "Invention: Covert Iris Scanner," 3 pages, printed Feb. 8, 2007.
Huang et al., "Iris Model Based on Local Orientation Description," 5 pages, prior to Jan. 25, 2006.
Huang et al., "An Efficient Iris Recognition System," IEEE Proceedings of the First International Conference on Machine Learning and Cybernetics, Beijing, pp. 450-454, Nov. 4-5, 2002.
Jalaja et al., "Texture Element Feature Characterizations for CBIR," IEEE, pp. 733-736, 2005.
Kalka et al., "Image Quality Assessment for Iris Biometric," Proc. of SPIE vol. 6202 62020D, 11 pages, 2006.
Ko et al., "Monitoring and Reporting of Fingerprint Image Quality and Match Accuracy for a Large User Application," IEEE Computer Society, Proceedings of the 33$^{rd}$ Applied Imagery Pattern Recognition Workshops, 6 pages, 2004.
Lau et al., "Finding a Small Number of Regions in an Image Using Low-Level Features," Pattern Recognition 35, pp. 2323-2339, 2002.
Ma et al., "Personal Identification Based on Iris Texture Analysis," IEEE Transactions on Pattern Analysis and Machine Intelligence, vol. 25, No. 12, pp. 1519-1533, Dec. 2003.
Masek, "Recognition of Human Iris Patterns for Biometric Identification," 61 pages, 2003.
Maurer et al., "Tracking and Learning Graphs and Pose on Image Sequences of Faces," IEEE Computer Society Press, International Conference on Automatic Face and Gesture Recognition, pp. 176-181, Oct. 14-16, 1996.
Oppenheim et al, "The Importance of Phase in Signals," Proceedings of the IEEE, vol. 69, No. 5, pp. 529-541, 1981.
Ratha et al., "A Real-Time Matching System for Large Fingerprint Databases," IEEE Transactions on Pattern Analysis, and Machine Intelligence, vol. 18, No. 8, pp. 799-812, Aug. 1996.
Sony, "Network Color Camera, SNC-RZ30N (NTSC) ," 6 pages, Aug. 2002.
Sun et al., "Robust Encoding of Local Ordinal Measures: A General Framework of Iris Recognition," 13 pages, prior to Jan. 25, 2006.
Wang et al, "Image Quality Assessment: From Error Visibility to Structural Similarity," IEEE Transactions on Image Processing vol. 13, No. 4, pp. 600-612, Apr. 2004.
Wang et al., "A Universal Image Quality Index," IEEE Signal Processing Letters, vol. 9, No. 3, pp. 81-84, Mar. 2002.
Wang et al., "Local Phase Coherence and the Perception of Blur," Advances in Nueral Information Processing Systems 16, pp. 1435-1442, 2004.

\* cited by examiner

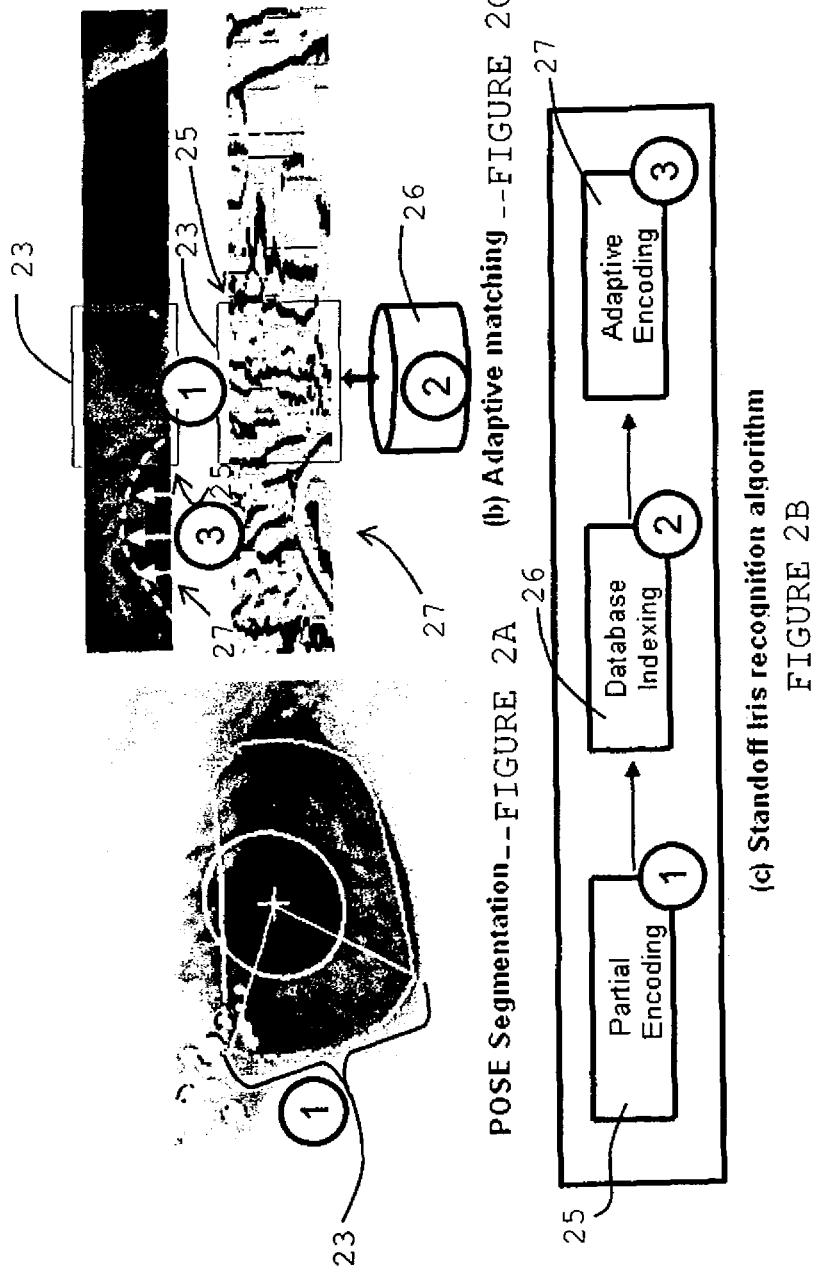

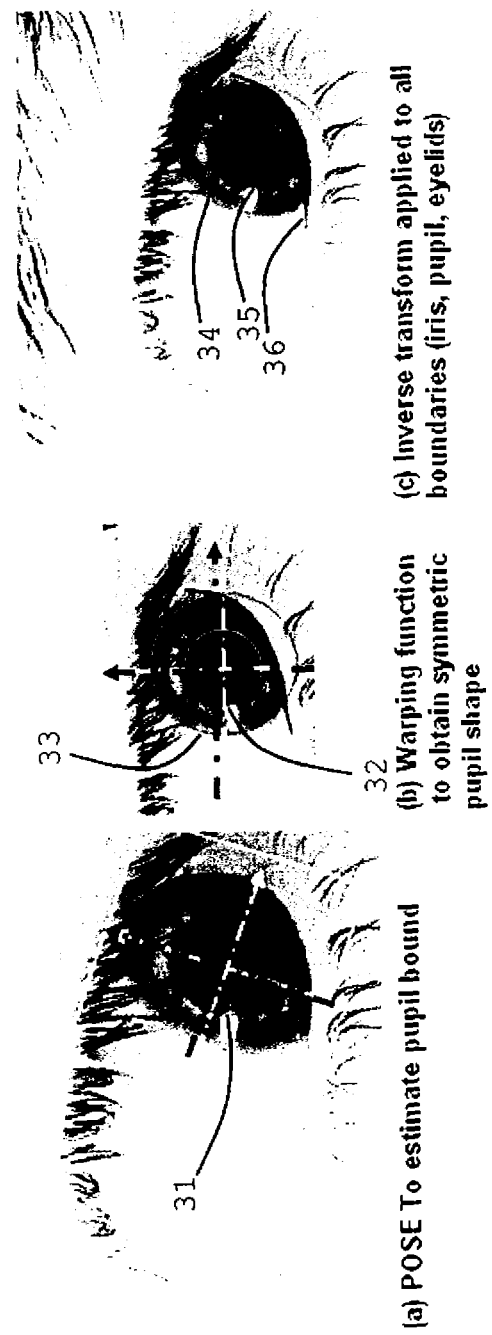

ADAPTIVE IRIS MATCHING USING DATABASE INDEXING

This application claims the benefit of U.S. Provisional Patent Application No. 61/268,678, filed Jun. 15, 2009, and entitled "Adaptive Iris Matching Using Database Indexing". U.S. Provisional Patent Application No. 61/268,678, filed Jun. 15, 2009, is hereby incorporated by reference.

BACKGROUND

The present invention pertains to recognition systems and particularly to biometric recognition systems; in particular the invention pertains to iris recognition systems.

SUMMARY

The invention is an adaptive iris matching approach for processing images of irises having a quality not sufficient for conventional non-adaptive matching approaches. Visible regions in a radial direction on an iris, without segmenting a circumferential of the iris, may be processed. A boundary of a visible region of the iris may be estimated. An iris map may be constructed with the non-visible portion of the iris masked. The iris map may be partially encoded. Partial codes of the iris map may be extracted to index at least portions of a database containing iris information. Irises may be retrieved from the database with an iris code as a query.

BRIEF DESCRIPTION OF THE DRAWING

FIG. 2a is a diagram of polar segmentation of an iris in an image;

FIG. 2b is a diagram of processing blocks for an adaptive iris matching approach;

FIG. 2c is a diagram of adaptive matching;

FIG. 3a is a diagram of polar segmentation used to estimate a pupil bound;

FIG. 3b is a diagram of model fitting using a pupil warp function to obtain a symmetric pupil shape and outside iris boundary;

FIG. 3c is a diagram of an inverse projection or transform as applied to iris, pupil and eyelid boundaries.

DESCRIPTION

Figures 1A, 1B, 1C:
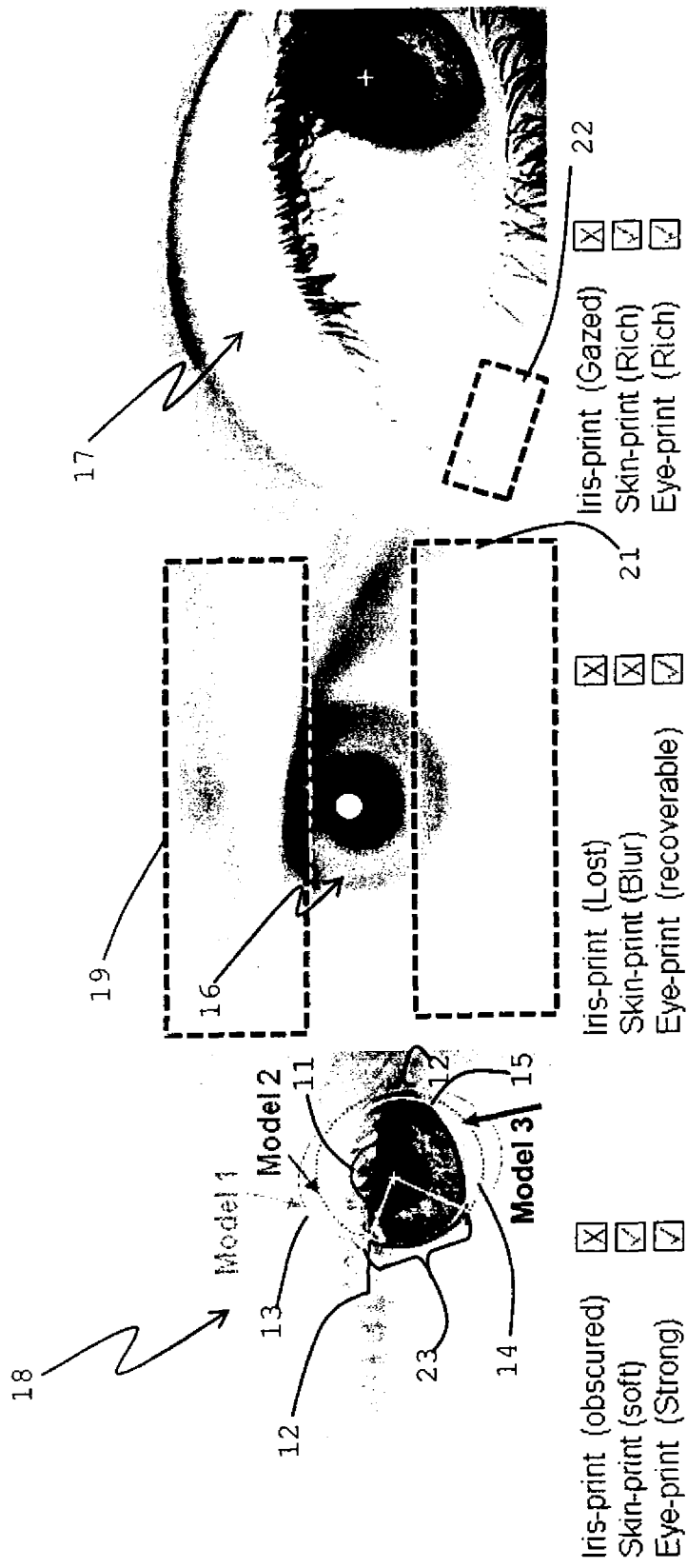
FIG. 1a is a diagram of an iris showing various delineated boundaries.
FIG. 1b is a diagram of a blurred iris image.
FIG. 1c is a diagram of a gazed eye.

While much progress has been made toward recognition through iris analysis under small variations in pose and lighting, reliable techniques for recognition under more extreme non-cooperative environments appear to have proven elusive. Iris recognition signatures may perform well when the data acquisition parameters are relatively constrained and the acquired data quality is moderately high. However, when the data acquisition and quality constraints are relaxed, the match performance of iris recognition may suffer a considerable decline.

This may be due in part to the variability of the resulting non-ideal iris relative to the constrained signature, and the likelihood that there is insufficient iris exposure to adequately normalize—a procedure required by virtually all existing iris algorithms. Apart from estimating these irregularities, the segmentation routine should also detect reflections due to ambient light sources and occlusions due to eyelashes and eyelids. The challenges of processing such irises may mount mostly in the segmentation process or a loss of iris information due to gazing or heavy obscurations.

One may introduce an adaptive solution based on partial segmentation and database indexing. A key aspect of the present approach may be that it does not necessarily require the usual upfront normalization procedure in order to capture these local variations and thus there is no need to estimate the entire outer border of the iris prior to matching. It is important to note that such a procedure may be crucial to virtually all existing iris recognition techniques.

One may introduce a technical approach to solve the above challenge by initially parsing through the portion of the iris that is visible, and then adaptively extracting features from the rest of the iris based upon data indexing and model fitting approximation. Present solution may extend the POSE technique (see e.g., U.S. patent application Ser. No. 11/043,366, filed Jan. 26, 2005, and entitled "Iris Recognition System and Method") having capabilities to adaptively extract features from the iris without the prior need to estimate the actual outer bound of the iris. It is arguable that it may suffice only to capture local sharp variations along the radial directions in the nonobscured areas of the iris. The key aspect of the present approach is that it does not require a normalization procedure in order to capture these local sharp variations. It is important to note that such a procedure may be crucial to virtually all existing iris recognition techniques. One may introduce an approach of an iris recognition technique that does not necessarily require normalization of the iris map.

The approach is based on the fact that local details of the iris are spread along the radial directions and thus virtually any visible iris region may be independently processed on the radial direction without estimating the circumferential of the iris.

The merit of the present approach is that it may allow users to enroll or match poor quality iris images that would be rejected by other states of the art technology. In addition, this approach may generate a list of possible matches instead of only the best match when the iris-print is too obscured to be a reliable matcher. Another merit of the present approach is that it may allow the iris recognition system to be more tolerable of noise and could potentially improve the matching process computational efficiency. The database may be easily indexed using a skin-print or eye-print to fewer manageable subsets of individuals.

One may solve the problem in three processing steps. 1) One may first segment only the visible region. Most of the fitting models may provide a reasonable estimate of the border segment to a first order estimation. 2) One then may extract the associated partial codes of the iris barcode to index a smaller population in a large population. 3) One then may recover the noisy information in the obscured area by adapting the appropriate fitting model that provides the best matching bits within the limited subset retrieved in step 1). The last processing step may be beneficial to denoise to some extent the obscured area as long as the iris information is not lost due to heavy gazing or obscurations.

In step 3, alternatively, one may capture the iris dyadic variations by formulating a dynamic encoder that takes into account the varying edge points. Due to the dyadic nature of wavelet functions, one may modify the encoding scheme to make use of a dynamic wavelet function that varies as a function of the angular variable. Unlike the standard wavelet transform, the wavelength scalar is not necessarily a constant but rather may be a smooth continuous function as a function of the angle variable. The output of the wavelet filter may thus be evaluated at each angle using virtually all possible values for the best match. The concatenated matched bits may determine the overall match score between a probe and query barcode.

The initialization step for the adaptive iris model may be based on the perspective projection of an ideal frontal pupil image (i.e., circular shape) into the actual image plane. Since the pupil edges are visible and easy to estimate, one may compute the warping projection function. One may use the inverse transform of the projection on both the pupil and iris edges to estimate the iris boundaries.

One may introduce a technical approach to solve the above problem by initially parsing through a portion of the iris that is visible, and then adaptively extracting features from the rest of the iris based upon data indexing and model fitting approximation. The solution may extend the POSE technique capabilities to adaptively extract features from the iris without the prior need to estimate the actual outer bound of the iris. Arguably, it may suffice only to capture local sharp variations along the radial directions in the non-obscured areas of the iris. A key aspect of the present approach is that it does not necessarily require a normalization procedure in order to capture the local sharp variations. It is important to note that such a procedure is crucial to virtually all existing iris recognition techniques. To one's best knowledge, one may introduce the first approach of an iris recognition technique that does not require normalization of the iris map.

A merit of the present approach is that it may allow users to enroll or match poor quality iris images that would be rejected by the current state of the art technology. In addition, this approach may generate a list of possible matches instead of only the best match when iris-print is too obscured to be a reliable matcher. Another merit of the present approach is that it may allow the iris recognition system to be more tolerable of noise and could potentially improve the matching process computational efficiency. The database may be easily indexed using skin-print or eye-print to fewer manageable subsets of individuals.

The original foundation of the iris technology and algorithms do not appear to address issues such as side looking eyes, self occlusion, non-frontal face images, and so forth. Recognition of this situation has led to solutions to address the real-time operational requirements of a standoff iris recognition system. The present approach is an efficient and robust one-dimensional (1D) fast segmentation approach built around the present approach for the Polar Segmentation (POSE) system (see e.g., U.S. patent application Ser. No. 11/043,366, filed Jan. 26, 2005, and entitled "Iris Recognition System and Method").

There may be great promise for iris technology with a false reject rate between 0.01-0.03 at a false acceptance rate of 10-3. The false non-matching rate (FNMR) versus false matching rate (FMR) may be better even on larger datasets. The uniqueness and richness of iris patterns when deployed to match billions of subjects may be a requirement that should be met to deploy the technology for things such as border control and the global war on terror.

A challenge to solve may be presented. Current iris recognition solutions do not necessarily reflect the full potential of the technology. Iris recognition signatures may perform well when the data acquisition parameters are relatively constrained and the acquired data quality is moderately high. However, when the data acquisition and quality constraints are relaxed, the match performance of iris recognition may suffer considerably. Very few developed techniques appear to address the true nature of iris irregularity in iris segmentation. This may be due in part to the variability of the iris-print in unconstrained scenarios and less than optimal acquisition conditions, as illustrated by the examples shown in FIGS. 1a, 1b and 1c. Apart from estimating these irregularities, the segmentation routine may also detect reflections due to ambient light sources and occlusions due to eyelashes and eyelids. The difficulties of processing such irises may reside mostly in the segmentation process, loss of spatial frequency content (e.g., blur side effect), or loss of iris information due to gazing or heavy obscurations.

As shown in FIGS. 1a, 1b and 1c, the pupil edges and the eyelids (highlighted at items 11 and 12) may be estimated. The iris borders, on the other hand, may yield multiple fitting models 1, 2 and 3, as noted with numerals 13, 14 and 15, respectively. The uncertainty in the iris segmentation may result in assigning bit codes to the wrong iris pixels during feature extraction, and therefore drastically affecting the matching outcome. Similarly, the blurry low-quality image 16 in FIG. 1b appears to have no high spatial frequency content of the actual iris pattern. The strong gazed eye 17 in FIG. 1c appears to have led to a compression of the iris information that cannot be recovered. An image acceptable to current commercial iris technology may generally require highly constrained conditions such as little to no gaze, high contrast, and rich spatial frequency content. Thus, these illustrative examples may represent a challenge for iris recognition technologies.

FIGS. 1a, 1b and 1c, from left to right, show examples of challenging cases of iris images: (1a) obscured eye 18 (1b) blurred eye 16 (boxes 19 and 21 indicate areas with key holistic ocular features), (1c) strong gazing 17 (patch(es) 22 indicate discriminating skin textures). No existing iris approach appears to address these types of problems simultaneously, as many seem to rely solely on visible iris-prints and constrained environments.

The present approach is an iris recognition system implementing image quality metrics as a first step of the process to assess the quality of the acquired eye image for reliable operation, and then apply the appropriate iris processing. Images with high quality may be processed using the POSE technique or virtually any third party reliable iris recognition system.

If the iris image does meet a subset of quality metrics (e.g., not blur but obscured images), then the eye image may be passed to the adaptive iris matching process described below. If the iris image does not meet a second set of quality metrics and cannot be rehabilitated, then the eye image may be rejected and a new eye image capture be sought by the eye-finder.

The present technical approach for iris quality measurement is described in U.S. patent application Ser. No. 11/681,614, filed Mar. 2, 2007, and entitled "Iris Recognition System Having Image Quality Metrics".

An adaptive iris matching technique (AIM) may be noted. Very few techniques appear to have been developed to address the true nature of iris irregularity in standoff iris segmentation. Apart from estimating these irregularities, the segmentation routine should also detect reflections due to ambient light sources and occlusions due to eyelashes, eyelids and gazing.

The present approach may be based on the fact that local details of the iris are spread along the radial directions, and thus virtually any visible iris region may be independently processed on the radial direction without segmenting the circumferential of the iris. It may suffice only to capture local variations along the radial directions in the non-obscured areas of the iris for inferring an iris biometrics. A key aspect of the present approach is that it does not necessarily require the usual upfront normalization procedure in order to capture these local variations; thus, there appears no need to estimate the entire outer border of the iris prior to matching. Such a procedure may be crucial to virtually all existing iris recognition techniques, and use the segmentation functionalities available in the POSE system. The present approach is illustrated in FIGS. 2a, 2b and 2c. FIG. 2a is a diagram of POSE segmentation. FIG. 2b shows AIM processing blocks partial encoding 25, database indexing 26 and adaptive coding 27. The blocks effectively show the following: (1) segment only visible iris regions; (2) index to a manageable database; and (3) search for a best matching model using adaptive encoding. FIG. 2c is a diagram of adaptive matching.

The present approach may solve the issue in three processing steps.

1) Partial encoding 25 may be noted. One may first segment only the visible region (e.g., the iris segment highlighted at 23 in FIG. 1a, as delineated by lid borders 12). The fitting model 15 in FIG. 1a may provide a reasonable first order estimation of the border segment. Since one may estimate the iris boundaries for the visible iris segment 23, one can construct the iris map using a "rubber sheet" model while masking the rest of the iris. One may then proceed to encode the phasor information of the extracted iris map using Log-Gabor or Wavelet filters so that comparisons between templates can be made at least partially.

2) Database indexing 26 may be noted. One may extract the associated partial codes of the iris barcode to index a smaller population in the large database. Verification of an iris barcode against large biometrics databases may be daunting, especially when one has only partial code for an iris. To retrieve irises from a large database, one may use the extracted iris code as a query and compute two feature vectors for the iris query (phasor based clustering and angular clustering). Organization of feature data may be completed hierarchically to compare one feature at a time, starting with the extracted feature elements that are closest to the inner iris boundary and going outward. Current linear database indexing does not necessarily leverage the data structure of the iris barcode. In one approach, one may use the KD-Tree search approach (e.g., see J. L. Bentley, "Multidimensional Binary Search Trees Used for Associative Searching," Comm. of the ACM, p. 18(9), 1975). Nearly any other alternative search process may be applied to this process step. A primary benefit of the KD-Tree algorithm is that it may enable the use of spatial structure within the data to limit the cost of the search. In one approach, one may use structures from multiple features, and their indexing to increase the efficiency of the search.

Irises may be retrieved from a large collection of databases using a visible iris barcode as a query and then finding the similarity measure for all the features of the iris codes in the database. A search process may be noted in U.S. patent application Ser. No. 11/681,751, filed Mar. 2, 2007, and entitled "Indexing and Database Search System".

3) Adaptive Encoding 27 may be noted. Appropriate segmentation of the rest of the iris may appear critical to the success of the iris recognition. Since data that is rescaled (e.g., replacing Model 1 (13) with Model 3 (15) in FIG. 1a) iris patterns may corrupt the iris code and the generated template, resulting in poor recognition rates, especially if the visible region is much smaller then the obscured regions. One may linearly adapt the fitting model that provides the best matching bits within the limited subset retrieved in Step 1 (25). The iris pattern deformation due to gazing could generate lateral pressure on some of the tissue that may cause small parts of the iris tissue to fold and change in patterns and some of which might be obscured by the eyelids. The approach may be to adaptively normalize the iris to adjust linearly the rubber sheet iris map to fit fewer identified models, as shown in FIG. 1a, and to align the map to the varying edge points of the model while searching for the minimum possible matching distance. The search may be executed only on the subset of subjects indexed at Step 2 (26) of the process. It is important to note that the map calibration may be applied not necessarily uniformly but rather linearly on the radial direction to fit the varying edge points of the matching model.

Alternatively, in another approach, in Step 3 (27) one may capture the iris dyadic variations by formulating a wavelet based encoder that takes into account the varying edge points. Due to the dyadic nature of wavelet functions, one may modify the encoding scheme to make use of a dynamic wavelet function that varies as a function of the angular variable, $$W_\alpha(R) = [\alpha(\theta)]^{-1/2} \int sig(r)\psi^*\left(\frac{r-R}{\alpha(\theta)}\right)dr, \tag{1}$$

where R is the translation parameter and $\alpha$ is the scale parameter. The function $\psi(\cdot)$ may be the mother wavelet. Unlike the standard wavelet transform, the wavelength scale $\alpha(\theta)$ may be a smooth continuous function of the angle. The concatenated matched bits may determine the overall match score between a probe and query barcode.

The initialization step for the adaptive iris model may be based on the perspective projection of an ideal frontal pupil image (i.e., circular shape) into the actual image plane. Since the pupil edges are visible and easy to estimate, one may compute the warping projection function. One may use the inverse transform of the projection on both the pupil and iris edges to estimate the iris boundaries as shown in FIGS. 3a, 3b and 3c. Polar segmentation may be used to estimate a pupil bound 31 in FIG. 3a. FIG. 3b shows a model fitting using pupil warp function to obtain a symmetric pupil shape 32 and outside iris boundary 33. The inverse projection or transform is applied to the iris 34, pupil 35 and eyelid 36 boundaries as shown in FIG. 3c. In the preprocessor approach, the iris signature is directly extracted from the reference warped image. By incorporating the warping projection in the adaptive iris matching algorithm, one may report an improvement of the matching accuracy at fixed equal error rate.

The following numbered items are information of the present system. 1) A standoff iris recognition system may have an iris image source, a quality processing module connected to the image source, where the quality processing module is for providing a quality assessment of an iris image.

2) In the system of item 1, the assessment of an iris image may be provided according to one or more of the following image conditions which include blur, obscuration, standoff angle, iris visibility, and so forth.

3) The system of item 2, may further have an evaluator connected to the quality measure, where the evaluator is for receiving a quality assessment of an iris image from the quality processing module, and for indicating whether the iris image is high quality, acceptable (can be processed using adaptive iris matching) or unacceptable for further processing, and the evaluator is for indicating whether an iris image that is unacceptable should be rejected or be rehabilitated for further processing, and the evaluator is for indicating whether an iris image that is acceptable should be processed using the adaptive iris matching process.

4) In the system of item 3, further processing may include segmentation of the iris image using adaptive process having partial encoding, database indexing, and adaptive matching.

5) The system of item 3, where the system medium that provides instructions of item 4 that, when executed by a machine, may further cause the machine to perform operations including normalizing a number of data points from the iris portion along the visible radial at an angle segment.

6) The recognition system that provides instructions of item 5 that, when executed by a machine, may further cause the machine to perform operations to encode the partial visible iris map signature.

7) The system of item 1 may have a approach of indexing: providing a database of templates; grouping the database into a plurality of sub-databases, where: each template in the database has a first number of bits (based on angular indexing), each sub-database of the plurality of sub-databases represents virtually all templates in the database, and each template in a sub-database has a second number of bits (hierarchical structure item, e.g., KD Tree approach).

8) The system of item 7 may further have providing a subset of possible template barcodes for matching, and selecting a second number of bits of a barcode that corresponds to the second number of bits of identified templates.

9) In the system of item 8, providing instructions of item 6 that, when executed by a machine, may further cause the machine to perform operations having normalizing a number of data points from the obscured iris portion to match one of the identified templates (Adaptive Encoding item: The best matching bits within the limited subset retrieved by the database indexing).

10) The recognition system that provides instructions of item 9 that, when executed by a machine, may further cause the machine to perform operations to encode the partial obscured iris map signature. (I.e., it may adaptively normalize the iris to adjust linearly the rubber sheet iris map to fit fewer identified models.)

11) The system of item 1 that provides instructions of item 10 that, when executed by a machine, may further cause the machine to perform operations having comparing the iris barcodes to a previously generated reference iris signature, indicated by item 8. (It may be an item on aligning the map to the varying edge points of the model while searching for the minimum possible matching distance).

The present standoff iris recognition approach using adaptive iris matching (AIM) may tackle the challenging case of iris recognition from images where irises are obscured but partially visible. One may provide an approach that may adaptively extract features from the iris without requiring the actual segmentation of the outer bound of the iris. It may suffice only to capture local sharp variations along the radial directions in the non-obscured areas of the iris. An aspect of the present approach may be that it does not require a normalization procedure in order to capture these local sharp variations. Such a procedure may be crucial to iris recognition techniques. One may introduce an approach of an iris recognition technique that does not require normalization of the iris map.

Figure 4:
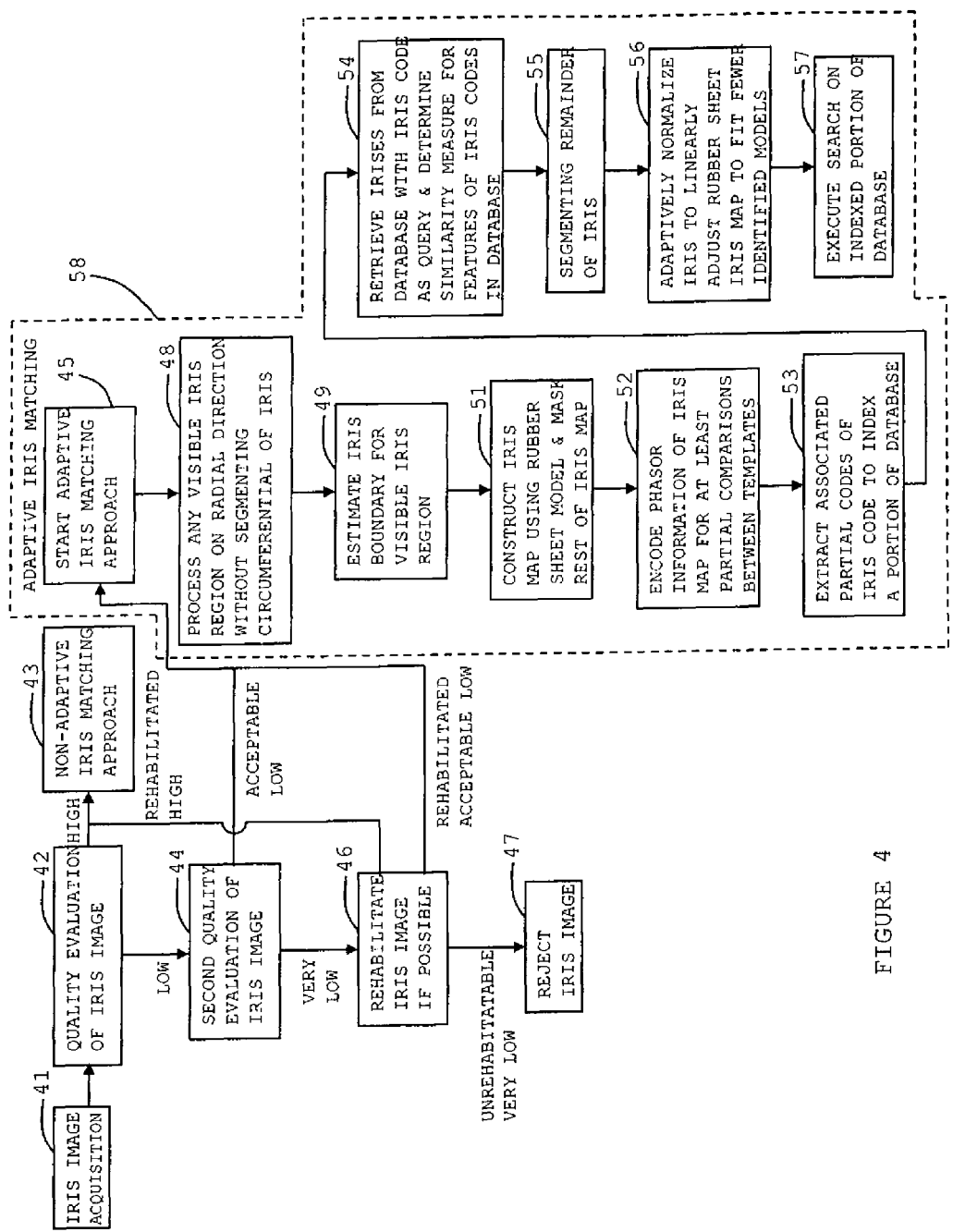
FIG. 4 is a diagram of an operation of an iris image processing approach.

FIG. 4 is a diagram of an operation of the present approach. A quality evaluation at symbol 42 may be made of an iris image from an iris image acquisition module at symbol 41. If the quality of the image is deemed to be "high" (by reaching a predefined iris quality measure adequate for an iris to be processed using iris signature), the image may be processed using a non-adaptive iris matching approach at symbol 43. Such an approach may be POSE noted herein, or some commercial approach. If the quality of image is deemed to be "low" (does not reach a predefined iris quality level that allows recognition of an identity using iris signature), a second quality evaluation of the image may be made at symbol 44. A result of the second evaluation may be "acceptable low", such as there is enough percentage of the iris region visible that can be processed, which indicates that the image may be processed by the present adaptive iris matching approach 58 starting at symbol 45. This image quality would not be acceptable to the non-adaptive iris matching approach at symbol 43. An alternative result of the second evaluation at symbol 44 may be "very low". Here, the image may be rehabilitated at symbol 46. Because of something like a glitch or other issue with the image which could be cleared up, a result may be a "rehabilitated acceptable low" which means that the image may go to the adaptive iris matching approach at symbol 45. The result of rehabilitation at symbol 46 could be a "rehabilitated high" which means that the image could go to the non-adaptive iris matching approach at symbol 43. Or the image may be deemed as an "unrehabilitatable very low" which means that the iris image would be rejected at symbol 47.

At symbol 45, the approach for adaptive iris matching may begin. The following is a summary of the approach for illustrative purposes but could incorporate additional details. There may be a processing of virtually any visible iris region on a radial direction at symbol 48, without segmenting a circumferential of the iris of the image. The iris boundary may be estimated for the visible iris region at symbol 49. An iris map may be constructed using a rubber sheet model at symbol 51. Rest of the iris map may be masked. Phasor information of the iris map may be encoded for at least partial comparisons between templates, as indicated at symbol 52. Associated partial codes of the iris code may be extracted to index a portion of a database at symbol 53. Irises, i.e., images of them, may be retrieved from the database with the iris code as a query and determine a similarity measure for features of iris codes in the database at symbol 54. At symbol 55, the remainder of the iris may be segmented. The iris may be adaptively normalized to linearly adjust the rubber sheet iris map to fit fewer identified models (i.e., narrow the search) at symbol 56. The search may be executed just on the indexed portion of the database at symbol 57.

Relevant applications may include U.S. patent application Ser. No. 11/675,424, filed Feb. 15, 2007, and entitled "Standoff Iris Recognition System"; U.S. patent application Ser. No. 11/372,854, filed Mar. 10, 2006, and entitled "Invariant Radial Iris Segmentation"; U.S. patent application Ser. No. 11/043,366, filed Jan. 26, 2005, and entitled "Iris Recognition System and Method"; U.S. patent application Ser. No. 11/672,108, filed Feb. 7, 2007, and entitled "Approaches and Apparatus for Eye Detection in a Digital Image"; U.S. patent application Ser. No. 11/681,614, filed Mar. 2, 2007, and entitled "Iris Recognition System Having Image Quality Metrics"; U.S. patent application Ser. No. 11/681,751, filed Mar. 2, 2007, and entitled "Indexing and Database Search System"; U.S. patent application Ser. No. 11/681,662, filed Mar. 2, 2007, and entitled "Expedient Encoding System; U.S. patent application Ser. No. 10/979,129, filed Nov. 3, 2004, entitled "System and Method for Gate Access Control"; U.S. patent application Ser. No. 10/655,124, filed Sep. 5, 2003, and entitled "System and Method for Dynamic Stand-Off Biometric Verification" (issued as U.S. Pat. No. 7,183,895); and U.S. Provisional Patent Application 60/778,770, filed Mar. 3, 2006, and entitled "Stand-Off Iris Detection Tracking and Recognition System"; all of which are hereby incorporated by reference.

In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A standoff iris recognition system comprising:
an iris image acquisition module;
an image quality evaluator connected to the iris image acquisition module; and
an adaptive iris matching module connected to the image quality evaluator and the eye image acquisition module; and
wherein the image quality evaluator determines if an eye image from the iris image acquisition module has a quality which is too low for a non-adaptive iris matching module and is sufficiently high enough for the adaptive iris matching module; and
wherein if the quality is high enough for the adaptive iris matching module, the adaptive iris matching module executes a search and generates a list of possible matches without segmenting a circumferential of an iris of the eye image.

2. The system of claim 1, wherein the non-adaptive iris matching module processes an iris image having sufficient quality so that a best match for the iris image can be generated from a database of iris images.

3. The system of claim 2, wherein the adaptive iris matching module processes an iris image having low but sufficient quality so that a group of most probable matches for the iris image instead of one best match can be generated from a database of iris images.

4. The system of claim 3, wherein the image quality evaluator determines whether an iris image has sufficient quality for successful processing by the non-adaptive iris matching module or not sufficient quality for successful processing by the non-adaptive iris matching module but has sufficient quality for processing by the adaptive iris matching module, or not sufficient quality for processing by the non-adaptive iris matching module or by the adaptive iris matching module.

5. The system of claim 4, wherein:
if an iris image has not sufficient quality for processing by the non-adaptive iris matching module or by the adaptive iris matching module, then the image is rehabilitated, if possible, for processing by the non-adaptive iris matching module or by the adaptive iris matching module; and
if the iris image cannot be rehabilitated, then the iris image is rejected.

6. The system of claim 1, wherein the image quality evaluator determines a quality of an iris image relative to blur, obscuration, standoff angle, and/or iris visibility of the iris image.

7. The system of claim 1, wherein the adaptive iris matching module is for segmenting a visible portion of an iris image, partial encoding, database indexing, and/or adaptive matching relative to the visible portion of the iris image.

8. The system of claim 7, wherein the adaptive iris matching module is further for normalizing data points of an iris portion along a visible radial at an angle segment of an iris image.

9. The system of claim 7, wherein the adaptive iris matching module is further for encoding a partial visible iris map signature of an iris image.

10. The system of claim 7, wherein the database indexing comprises:
providing a database having templates; and
grouping the database into a plurality of sub-databases; and
wherein:
each template in the database has a first number of bits based on angular indexing;
each sub-database of the plurality of sub-databases represents virtually all templates in the database; and/or
each template in a sub-database has a second number of bits based on a hierarchical structure.

11. The system of claim 10, wherein the database indexing further comprises:
providing a subset of template barcodes for possible matching; and/or
selecting a second number of bits of a barcode that corresponds to the second number of bits of each template.

12. The system of claim 11, wherein the adaptive iris matching module is further for normalizing a number of data points from an obscured iris portion of an iris image to match one of the templates.

13. The system of claim 12, wherein the adaptive iris matching module is further for encoding a partial obscured iris map signature.

14. The system of claim 13, wherein the adaptive iris matching module is further for comparing iris barcodes to a previously generated reference iris signature.

15. A method for standoff iris recognition, comprising:
segmenting a visible region of an iris, with a model providing a first order estimate of a border segment;
extracting associated partial codes of a barcode of the iris to index a smaller population of a whole population; and
recovering noisy information in an obscured area by adapting a fitting model that provides best matching bits within the visible region of the iris;
wherein:
iris dyadic variations are captured by formulating a dynamic encoder that takes into account varying edge points; and
an encoding scheme is modified to make use of a dynamic wavelet function wherein a wavelength scalar of the wavelet function varies as a function of an angular variable.

16. The method of claim 15, wherein:
the dynamic wavelet function is a smooth continuous function of the angular variable; and
an output of the dynamic wavelet function is enabled at each angle using virtually all possible values for a best match.

17. The method of claim 16, wherein concatenated matched bits can determine an overall match score between a probe and a query barcode.

18. A method for adaptive iris matching, comprising:
acquiring an image of an iris;
evaluating quality of the image;
processing a visible region of the iris in the image on a radial direction without segmenting a circumferential of the iris in the image, if the quality is too low for non-adaptive iris matching but high enough for adaptive iris matching;
estimating a boundary for the visible region of the iris in the image;
constructing an iris map using a rubber sheet model;
masking a non-visible region of the iris;

encoding the iris map for at least partial comparisons between templates;
extracting associated partial codes of an iris code to index a portion of a database; and
retrieving a list of two or more possible iris matches from the database with the iris code as a query.

* * * * *